(12) United States Patent
Baron

(10) Patent No.: US 8,603,285 B1
(45) Date of Patent: Dec. 10, 2013

(54) MIRROR SUPPORT

(75) Inventor: Richard L. Baron, La Crescenta, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 572 days.

(21) Appl. No.: 12/718,206

(22) Filed: Mar. 5, 2010

Related U.S. Application Data

(63) Continuation of application No. 12/128,817, filed on May 29, 2008, now abandoned.

(51) Int. Cl.
*B32B 37/14* (2006.01)

(52) U.S. Cl.
USPC .................. 156/272.2; 428/323; 359/883

(58) Field of Classification Search
USPC ................. 156/272.2; 359/883, 383, 871; 428/411.1, 323, 408
See application file for complete search history.

(56) References Cited

U.S. PATENT DOCUMENTS

| | | | | |
|---|---|---|---|---|
| 5,658,698 | A * | 8/1997 | Yagi et al. | 430/11 |
| 7,022,629 | B2 * | 4/2006 | Theriault | 442/349 |
| 2006/0258054 | A1 * | 11/2006 | Pan et al. | 438/122 |
| 2007/0074316 | A1 * | 3/2007 | Alden et al. | 977/762 |
| 2010/0098902 | A1 * | 4/2010 | Kotov et al. | 428/105 |

FOREIGN PATENT DOCUMENTS

JP 2000-231093 * 8/2000

OTHER PUBLICATIONS

English abstract of JP 2000-231093.*
S. Huang, L. Dai, A.W.H. Mau, "Patterened Growth and Contact Transfer of Well-Aligned Carbon Nanotube Films", J. Phys. Chem. B 1999, 103, 4223-4227.*

* cited by examiner

*Primary Examiner* — Richard Crispino
*Assistant Examiner* — Elizabeth Royston
(74) *Attorney, Agent, or Firm* — Mark Homer

(57) ABSTRACT

Disclosed herein is a method of making a mirror support comprising a composite, the composite comprising a plurality of carbon nanotubes, wherein at least two of the plurality of carbon nanotubes are bonded to each other through a bridging moiety bound to each of the two carbon nanotubes, and a laminate comprising the composite.

10 Claims, 3 Drawing Sheets

MIRROR SUPPORT

CLAIMING BENEFIT OF PREVIOUSLY FILED APPLICATION

This application is a continuation application based on previously filed application Ser. No. 12/128,817, filed May 29, 2008 now abandoned and, hence, the applicant requests this priority date. This application contains no new subject matter (the specification and drawings are identical, but new claims have been included that replace the original claims). The applicant also requests that the Information Disclosure Statement previously filed by the applicant in application Ser. No. 12/128,817 and the references considered by the examiner in said application be considered in this application.

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND OF THE INVENTION

The instant disclosure generally relates to a mirror support comprising a composite, the composite comprising a plurality of interlinked or inter-connected carbon nanotubes, and a method of making the mirror support.

Mirror supports for instruments requiring precision e.g., for large telescopes, often require a myriad of compromises. An optimal mirror support would preferably include a low areal density, a high thermal conductivity, a low coefficient of thermal expansion, high stiffness, a high strength to weight ratio, high reflectivity throughout much of the UV, IR and radio spectrum, and would be superconductive when cooled below 100° K.

However, materials having the required stiffness often have a large areal density. Materials having a low coefficient of thermal expansion often have relatively low strength to weigh ratios and/or low thermal conductivity. Accordingly, there is a need in the art for a mirror support which more closely approximates an optimal mirror support.

Individual carbon nanotubes may provide at least some of the properties of a more optimal mirror support. Numerous references are directed to carbon nanotubes and there use in a variety of applications. For example, U.S. Pat. No. 7,259,106 to Jain (Jain-106) is generally directed to a circuitry sheet comprising an electronic device layer stack containing electronic devices. Jain-106 discloses the use of a temporary substrate in which a suitable conductor material may also include graphite sheets, and conductive carbon nanotubes sheets, films and foils. Jain-106 also discloses the combination of this substrate with a stiffener.

U.S. Pat. Nos. 6,756,025; 6,756,026; 6,824,755; 6,939,525; 7,048,903; 7,052,666; 7,067,098; 7,097,820; and 7,115,864; and U.S. Patent Publication Nos. 2004-0265209 and 2005-0244326 to Colbert et al. (collectively referred to herein as Colbert) are generally directed to a single-wall carbon nanotubes purification process and more particularly to a purification process that comprises heating a single-wall carbon nanotube-containing felt under oxidizing conditions to remove the amorphous carbon deposits and other contaminating materials. The felt may be heated in an aqueous solution of an inorganic oxidant, such as nitric acid, a mixture of hydrogen peroxide and sulfuric acid, or a potassium permanganate to produce a high proportion of single-wall nanotubes that are substantially free of other material.

U.S. Pat. No. 7,264,990 to Rueckes et al. (Rueckes-990) is generally directed to nanotube films and articles, and methods of making the same. Rueckes-990 discloses conductive articles including an aggregate of nanotube segments in which the nanotube segments contact other nanotube segments to define a plurality of conductive pathways along the article. The articles may be disposed on substrates, and may form an electrical network of nanotubes within the article itself. Conductive articles may be made on a substrate by forming a nanotube fabric on the substrate, and defining a pattern within the fabric in which the pattern corresponds to the conductive article. According to Rueckes-990, nanotube fabric may be formed by growing the nanotube fabric on the substrate using a catalyst, by depositing a solution of suspended nanotubes on the substrate, by spin-coating, by dipping a substrate into a solution of carbon nanotubes, or by spraying an aerosol having nanotubes onto a surface of a substrate.

U.S. Pat. Nos. 6,683,783 (Smalley-783) and its divisional applications 6,749,827, 6,949,237, 6,979,709, 6,986,876, 7,008,604, 7,041,620, 7,048,999, 7,087,207, 7,105,596, 7,108,841, and 7,205,069 (collectively referred to as Smalley) are generally directed to membranes comprising an array of single-wall carbon nanotubes wherein the membrane is nanoporous. The Smalley references disclose a membrane comprising a substantially two-dimensional array of a homogeneous population of single-walled nanotubes aggregated in substantially parallel orientation to form a monolayer extending in directions substantially perpendicular to the orientation of the individual nanotubes. Smalley discloses composite materials, defined as materials that are composed of two or more discrete constituents. According to Smalley, composites include a matrix, which serves to enclose the composite and give it its bulk form, and a structural constituent, which determines the internal structure of the component. The matrix deforms and distributes an applied stress to the structural constituent. Although composites are generally extremely strong, their strength is generally anisotropic, being much less in the direction perpendicular to the plane of the composite material than any parallel direction. Smalley also discloses that composites formed in layers or in laminate strips are prone to delamination. Smalley discloses use of carbon nanotube structural constituents to improve the properties of conventional composite materials. One such example involves composites built-up of fibrous laminates impregnated and bonded with a polymer matrix material. Graphite fiber fabric layers bonded with an epoxy system is a well-known example of such a composite. By using carbon nanotube ropes or fibers that exhibit a 3-D loopy structure added only at the epoxy/graphite interfaces, resistance to delamination of the resulting laminar composite can be substantially increased. The carbon nanotube material can be dispersed in the epoxy system before impregnation (or premixed into one of the reactive components thereof). The carbon nanotube material can also be dispersed in a liquid carrier and sprayed or otherwise applied to the laminate as each graphite fabric layer is added.

U.S. Patent Publication No. 2007/0059452 to Debe et al. (Debe-452) is generally directed to a process for extending the length of nanostructured support elements of thin film layers. The processes involve the initial formation of nanostructured support elements during a first annealing step, a coating of material deposited on the nanostructured support elements, and a second annealing step wherein the initially formed nanostructured support elements longitudinally extend. Layers having extended nanostructured support elements are also described.

EP1787955 is generally directed to an aligned single layer carbon nanotube bulk structure, which comprises an assembly of a plurality of aligned single-layer carbon nanotube and has a height of not less than 10 micrometers, and an aligned single-layer carbon nanotube bulk structure which comprises an assembly of a plurality of aligned single-layer carbon nanotubes and has been patterned in a predetermined form. This structure is produced by chemical vapor deposition (CVD) of carbon nanotubes in the presence of a metal catalyst in a reactive atmosphere with an oxidizing agent, preferably water, added thereto. An aligned single-layer carbon nanotube bulk structure, which has realized high purity and significantly large scaled length or height, its production process and apparatus, and its applied products are provided.

While numerous references are directed to carbon nanotubes and there use, composites, laminates, and other substrates comprising inter-connected carbon nanotubes and/or a web of inter-connected nanotubes and/or a web of inter-connected carbon nanotubes which are also connected chemically to an interstitial matrix have been largely ignored.

Accordingly, there is a need for a mirror support having at least some of the properties of individual carbon nanotubes.

SUMMARY OF THE INVENTION

In one aspect of the present invention, a mirror support comprises a composite, the composite comprising a plurality of carbon nanotubes, wherein at least two of the plurality of carbon nanotubes are bonded to each other through a bridging moiety bound to each of the two carbon nanotubes.

In yet another aspect of the present invention, a mirror support comprises a composite, the composite comprising a laminate, the laminate comprising a plurality of layers each in physical contact with at least one other layer, wherein at least one of the plurality of layers comprises a plurality of carbon nanotubes, wherein at least two of the plurality of carbon nanotubes are bonded to each other through a bridging moiety bound to each of the two carbon nanotubes.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
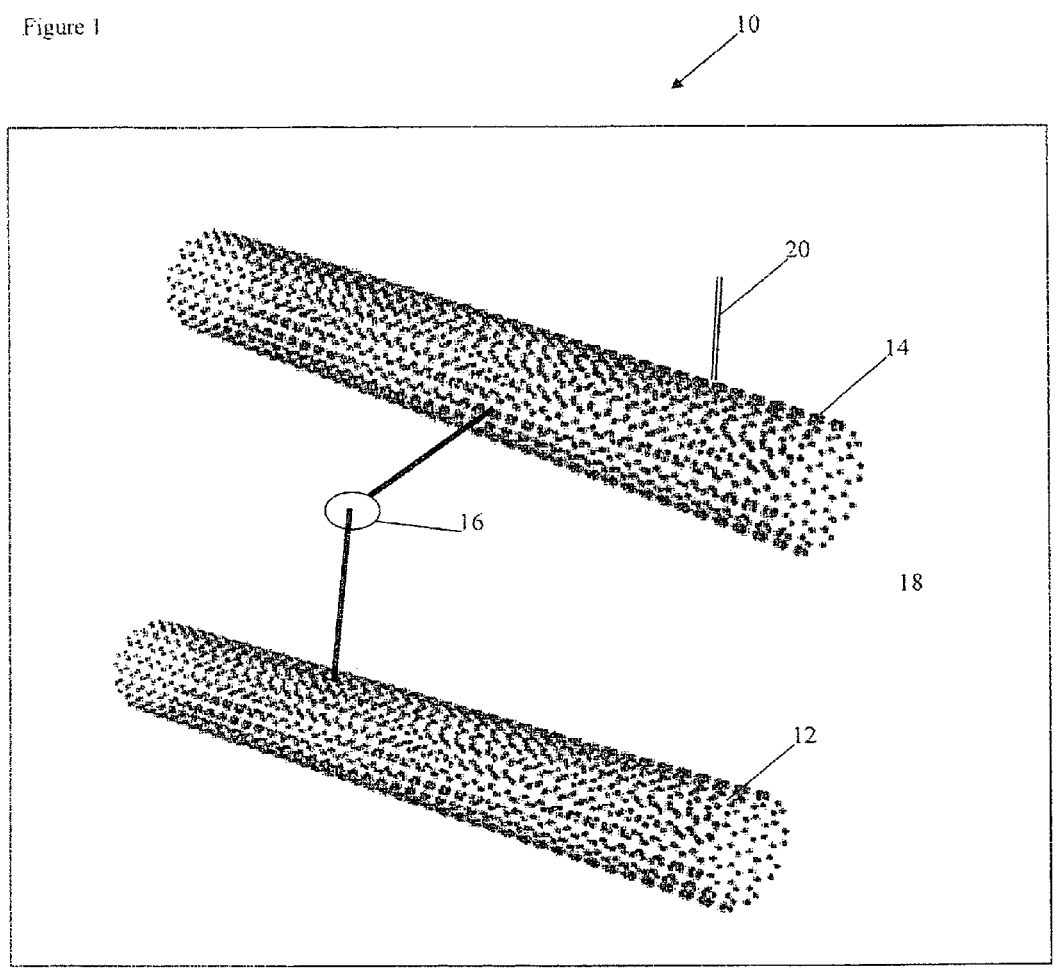
FIG. 1 is a schematic view of two inter-connected carbon nanotubes of a composite of the instant disclosure.

The following detailed description is of the best currently contemplated modes of carrying out the invention. The description is not to be taken in a limiting sense, but is made merely for the purpose of illustrating the general principles of the invention, since the scope of the invention is best defined by the appended claims.

In the following description, numerous specific details are set forth to provide a thorough understanding of the present invention. However, it will be obvious to those skilled in the art that the present invention may be practiced without such specific details. In other instances, well-known devices have been shown in block diagram form in order not to obscure the present invention in unnecessary detail. For the most part, details unnecessary to obtain a complete understanding of the present invention have been omitted in as much as such details are within the skills of persons of ordinary skill in the relevant art.

Refer now to the drawings wherein depicted elements are not necessarily shown to scale and wherein like or similar elements are designated by the same reference numeral through the several views.

Broadly, the present invention generally provides a mirror support. The term mirror support as used herein may include a mirror support, and/or a blank of a mirror support which, after additional conditioning and/or manipulation is suitable for use as a mirror support. The mirror support of the instant disclosure may comprise a composite comprising a plurality of carbon nanotubes, wherein at least two of the plurality of carbon nanotubes are bonded to each other through a bridging moiety bound to each of the two carbon nanotubes. In another embodiment, the mirror support of the instant disclosure may comprise a composite comprising a plurality of carbon nanotubes which are interconnected to at least one additional carbon nanotube through a bridging moiety. In still another embodiment, the mirror support of the instant disclosure may comprise a composite comprising interconnected carbon nanotubes connected through a bridging moiety forming a web of interconnected carbon nanotubes, which may be arranged in layers or webs. In still another embodiment, the mirror support of the instant disclosure may comprise a composite comprising layers of webs of interconnected carbon nanotubes which may be interconnected between the layers through bridging moieties.

In more specifically describing the present invention, FIG. 1 shows a schematic view of two inter-connected carbon nanotubes 12 and 14 of a composite, generally referred to as 10, of the instant disclosure. Each of the carbon nanotubes 12 and 14 are chemically bonded to one another (i.e., connected) through a bridging group 16, which is in turn bound to each of the two carbon nanotubes 12 and 14. As shown in FIG. 1, at least one of the carbon nanotubes 14 may further be bound to interstitial matrix 18 via a chemical bond 20 and or via the bridging group 16.

Carbon nanotubes suitable for use herein may be formed from any number of processes, including arc discharge, laser ablation, through reaction of high pressure carbon monoxide, and chemical vapor deposition (CVD). These processes may take place in vacuum and/or with process gases and/or at atmospheric pressure.

The carbon nanotubes may be single walled, double, and/or multi-walled, depending on the particular application. Furthermore, the carbon nanotubes suitable for use herein include those in the armchair configuration, the zigzag configuration, various chiral configurations, and the like, as is known to one of skill in the art.

The carbon nanotubes of the instant disclosure may be greater than about 1 nm, preferably greater than about 10 nm in diameter. The carbon nanotubes suitable for use herein preferably have an aspect ratio (length/diameter) of greater than or equal to about 5, preferably greater than or equal to about 10, preferably greater than or equal to about 100, more preferably greater than or equal to about 1,000, with greater than or equal to about 1,000,000 being still more preferred. However, nanotubes and/or concatenations of nanotubes extending to lengths of meters to kilometers are quite suitable as well.

Figure 2:
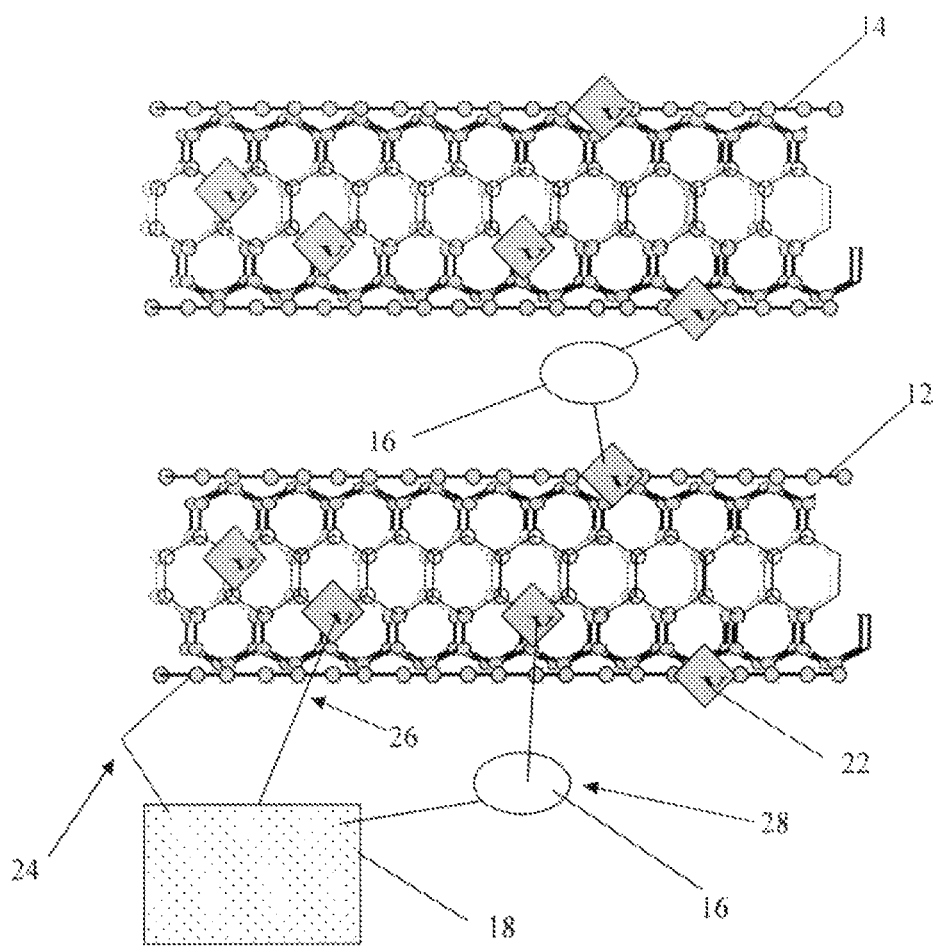
FIG. 2 is a schematic view of a carbon nanotube of the instant disclosure with chemical attached functional groups or elements.

As shown in FIG. 2, in an embodiment, at least one of the plurality of carbon nanotubes 12 comprises one or more functional groups 22 wherein carbon nanotube 12 may bond with a bridging moiety, and/or with an interstitial matrix. Accordingly, the carbon nanotubes may be cross-linked together. In an embodiment, the composite may include cross-linked carbon nanotubes in which the bridging moiety may be covalently bound to the carbon nanotube, non-covalently bound to the carbon nanotube e.g., via n-stacking (see for example, Katz, E. J. Electroanal. Chem. 1994, 365, 157; and Jaegfeldt, H.; Kuwana, T.; Johansson, G. J. Am. Chem. Soc. 1983, 105, 1805, both of which are incorporated by referenced for the teachings directed to n-stacking), or a combination thereof.

In an embodiment, the bridging moiety comprises a metal or metalloid atom. In yet another embodiment, the bridging moiety consists essentially of, or consists of a metal or metalloid atom. For purposes herein, a metalloid atom is defined as including boron (B), aluminum (Al), silicon (Si), germanium (Ge), arsenic (As), antimony (Sb), tellurium (Te), polonium (Po), and/or astatine (At.) In an embodiment, the bridging moiety includes metals and/or metalloids from Groups 1-15, preferably groups 4-14, more preferably groups 4-6, 13, and 14, with aluminum, titanium, silicon, and combinations thereof being still more preferred.

In an embodiment, the carbon nanotube may be modified to include a functional group chemically bonded to the carbon nanotube, and the bridging moiety and/or the interstitial matrix may be bonded to the carbon nanotube through the functional group.

In an embodiment, the bridging moiety and/or the functional group bonded with the carbon nanotube comprises a multivalent organic or organometallic radical. Multivalent organic and/or organometallic radicals suitable for use as bridging moieties and/or functional groups include divalent organic radicals, trivalent organic radicals, and the like, and may each independently comprise an organic and/or an inorganic functional group, or a functional group substituted with one or more functional groups, wherein each of the functional groups comprises a one or more metal atoms, H, C, O, S, P, Si, Se, or a combination thereof.

Multivalent organic and/or organometallic radicals suitable for use as bridging moieties and/or functional groups include organic and inorganic radicals comprising hydrogen, and/or atoms from Groups 13, 14, 15, 16, and/or 17, preferably 1 to 20 carbon atoms, oxygen, sulfur, phosphorous, silicon, selenium, or a combination thereof. In addition, bridging moieties and/or functional groups may include one or more radicals substituted with one or more additional radicals.

Suitable radicals include: hydrogen, hydroxyl, alkyl, alkyloxy, alkenyloxy, aryl, aryloxy, aralkyl, aralkyloxy, alkaryl, arylalkenyl, cycloalkyl, cycloalkyloxy, aliphatic, hydroxyl, alkanol, alkanolamine, oxy, acetyl, acetamido, acetoacetyl, acetonyl, acetonylidene, acrylyl, alanyl, allophanoyl, anisyl, benzamido, butryl, carbonyl, carboxy, carbazoyl, caproyl, capryl, caprylrl, carbamido, carbamoyl, carbamyl, carbazoyl, chromyl, cinnamoyl, crotoxyl, cyanato, decanoly, disiloxanoxy, epoxy, formamido, formyl, furyl, furfuryl, furfurylidene, glutaryl, glycinamido, glycolyl, glycyl, glyocylyl, heptadecanoyl, heptanolyl, hydroperoxy, hydroxamino, hydroxylamido, hydrazido/hydrazide, hydroxy, iodoso, isoccyanato, isonitroso, keto, lactyl, methacrylyl, malonyl, nitroamino, nitro, nitrosamino, nitrosimino, nitrosyllnitroso, nitrilo, oxamido, peroxy, phosphinyl, phosphide/phosphido, phosphite/phosphito, phospho, phosphono, phosphoryl, seleninyl, selenonyl, siloxy; succinamyl, sulfamino, sulfamyl, sulfeno, thiocarboxy, toluoyl, ureido, valeryl radicals, acetimido, amidino, amido, amino, aniline, anilino, arsino, azido, azino, azo, azoxy, benzylidine, benzidyne, biphenyl), butylene, iso-butylene, seq-butylene, tert-butylene, cyano, cyanamido, diazo, diazoamino, ethylene, disilanyl, glycidyl, guanidino, guanyl, heptanamido, hydrazino, hydrazo, hypophosphito, imido, isobutylidene, isopropylidene, silyl, silylene, methylene, mercapto, methylene, ethylene, naphthal, napthobenzyl, naphthyl, naphthylidene, propylene, propylidene, pryidyl, pyrryl, phenethyl, phenylene, pyridino, sulfonyl, sulfo, sulfonyl, tetramethylene, thenyl, thienyl, thiobenzyl, thiocarbamyl, thiocarbonyl, thiocyanato, thionyl, thiuram, toluidino, tolyl, a-tolyl, tolylene, a-tolylene, tosyl, triazano, ethenyl (vinyl), selenyl, trihydrocarbylamino, trihaloamino, trihydrocarbyl phosphite, trihalophosphine, trimethylene, trityl, vinylidene, xenyl, xylidino, xylyl, xylylene, dienes, and combinations thereof.

In an embodiment, the plurality of carbon nanotubes are dispersed within an interstitial material also referred to herein as the interstitial matrix. Suitable interstitial materials include polymeric resins and/or inorganic substrates. Preferred polymeric resins may include high density polyethylene, linear low-density polyethylene, super-low-density polyethylene; ethylene-vinyl acetate copolymer, ethylene-acrylate copolymer, ethylene-acrylic acid copolymer, ethylene-methacrylic acid copolymer, ethylene-carbon monoxide copolymer, amorphous polystyrene, crystalline polystyrene, vinyl chloride resin, polyamide resin, polyacetal resin, polycarbonate resin, ethylene-propylene rubber, ethylene-1-butene rubber, propylene-1-butene rubber, styrene-butadiene rubber, styrene-butadiene block copolymer, or a combination thereof.

Preferred inorganic substrates may comprise materials generally known in the art as glass. As used herein, the term glass is defined as an amorphous solid, a vitreous solid, and/or a super cooled liquid. In addition, crystalline materials and/or partially crystalline materials may also be used.

Numerous suitable glasses exist, and include silicon based glass (e.g., $SiO_2$), titanium based glass (e.g., $TiO_2$), and/or transitions metal phosphate glass such as niobium phosphate glass, combinations thereof, and the like. Glasses suitable for use herein include optical glasses as well as those suitable for a myriad of other purposes.

Other glasses suitable for use herein include glasses comprising inorganic, preferably metal oxides, and/or organic materials, including plastics (e.g., acrylic glass), carbon, metals, carbon dioxide, phosphates, borates, chalcogenides, fluorides, germanates (e.g., glasses based on $GeO_2$), tellurites (e.g., glasses based on $TeO_2$), antimonates (e.g., glasses based on $Sb_2O_3$), arsenates (e.g., glasses based on $As_2O_3$), aluminates, (e.g., glasses based on $Al_2O_3$), titanates (e.g., glasses based on $TiO_2$), tantalates (e.g., glasses based on $Ta_2O_5$), nitrates, carbonates, combinations thereof, and the like. Other suitable glasses include fluorozirconate, fluoroaluminate, aluminosilicate, phosphate and chalcogenide glasses, combinations thereof, and the like. In an embodiment, the glass may include a material in which extremes of pressure and temperature result in structural and physical changes to produce polyamorphic phase transitions, e.g., an amorphous phase of carbon dioxide, known in the art as amorphous carbonia (a-$CO_2$) and the like, which may exhibit an atomic structure resembling that of silicon based glass.

The substrates may further be doped with materials capable of producing ions which migrate and form bonds between the carbon nanotubes and/or between the carbon nanotubes and the interstitial matrix under anodic bonding. The substrates may be doped by applying the material directly to the substrate by a variety of methods known in the art, and/or the substrate may be produced to include the doping material. Examples of doping materials include metals and/or metal containing compounds, metalloids (e.g., boron) and/or metalloid containing compounds, combinations thereof, and the like.

As shown in FIG. 2, in an embodiment, the plurality of carbon nanotubes 12 and 14 are dispersed within an interstitial material 18, preferably wherein at least one of the carbon nanotubes 12 are bonded to the interstitial material 18, either directly, indicated by arrow 24, or through a functional group indicated by arrow 26, or via bridging moiety 16, indicated by arrow 28.

In an embodiment, at least a portion of the carbon nanotubes of the instant composite may further be aligned with one-another. By aligned, it is meant that a plurality of carbon nanotubes, each having a minor axis parallel with the diameter of the tube, and a major axis perpendicular to the diameter of the tube, are oriented such that a portion of the carbon nanotubes has a major axis essentially parallel to the major axis of another carbon nanotube, in an amount greater than would be present in a random distribution of carbon nanotubes. Accordingly, aligned carbon nanotubes do not require essentially all of the carbon nanotubes to be parallel to one another, but merely requires alignment of more than would be aligned in a random collection of carbon nanotubes under the same set of conditions.

Figure 3:
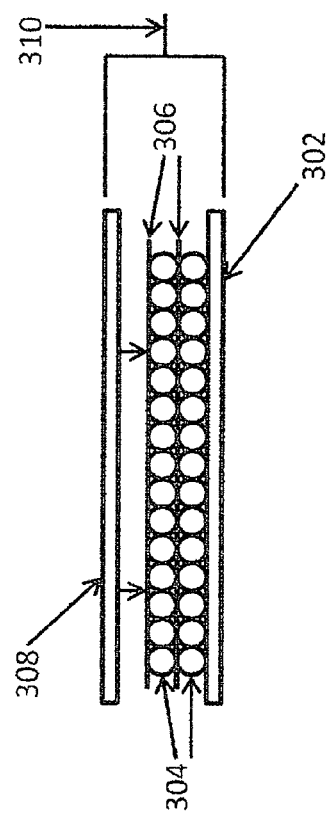
FIG. 3 is a block diagram showing the different layers of an embodiment of the present invention.

As shown in FIG. 3, a first layer of carbon nanotubes 304 are arranged on a bottom substrate 302. An interstitial matrix material 306 is applied to the carbon nanotubes 304. It should be understood by one skilled in the art that the interstitial matrix material 306, although depicted as a single layer atop the carbon nanotubes 304 for the purposes of showing the order of assembly of the embodiment depicted in the figure, that the interstitial matrix material 306 will fill the spaces between the carbon nanotubes 304. Optionally, a second layer of carbon nanotubes 304 and interstitial matrix material 306 may be applied atop the first layers as shown. A top substrate 308 is placed upon the carbon nanotubes 304 and interstitial matrix material 306. Force may be applied to the top substrate 308 to compressed the carbon nanotubes 304 and interstitial matrix material 306 as further described herein. An electric potential 310 may be applied to all of the layers to provide anodic bonding as described further below.

In an embodiment, at least two of the plurality of carbon nanotubes are bonded to each other using anodic bonding, fusion bonding, low-pressure chemical vapor deposition, oxidation, plasma enhanced chemical vapor deposition, combinations thereof, and the like.

In anodic bonding, the carbon nanotubes are bonded at elevated temperatures in the range from 100° C. to about 800° C. by placing and preferably clamping a substrate comprising the carbon nanotubes between two metal electrodes. An electric potential, preferably a DC potential greater than or equal to about 1 kV or higher is then applied between the electrodes creating an electrical field, which penetrates the substrates. The substrate comprises ions which are capable of migration when placed under the above DC potential. One substrate is preferably a glass that contains mobile ions, e.g., metal ions, sodium ions and/or ions that result from a doping compound, which at the elevated temperature are displaced from the bonding surface of the substrate by the applied electrical field. The depletion of these ions near the surface of the glass makes the surface highly reactive with the surface of the other substrate, which preferably includes silicon, and/or other similarly chemically active material and thus forming a solid chemical bond between the carbon nanotubes and/or between the carbon nanotubes and the substrate.

In an embodiment, a substrate may be prepared for anodic bonding by patterning, etching, oxidation, and/or the like, and then the carbon nanotubes may be deposited onto the substrate. One or more interstitial matrix layers, doping material layers, and/or the like may be added, as may one or more additional layers of carbon nanotubes. In an embodiment, the carbon nanotubes my then be aligned. The layer of carbon nanotubes and the interstitial matrix may then be sandwiched between a second substrate, which may or may not include a doping material. The layers may then be compressed and an electric potential applied thereto. The temperature of the materials may also be increased. After a period of time, a carbon nanotube composite is produced.

In an embodiment, the process may include fusion bonding, wherein the substrates are first forced into intimate contact by applying a contact force. Once in contact the substrates hold together due to atomic attraction forces (e.g., Van der Waals forces), which are strong enough to allow the bonded substrates to be handled. The substrates are then placed in a furnace and annealed at high temperature, after which a solid bond is formed between the substrates.

In an embodiment, the process may include an evaporation step, wherein the substrate is placed in a high vacuum chamber at a temperature wherein a crucible or other container containing the material is deposited, which may be a precursor of a functional group and/or a precursor of the bridging moiety. A heating source is used to heat the crucible causing the material to evaporate and condense on all exposed cool surfaces of the vacuum chamber and substrate. Typical sources of heating are: E-beam, resistive heating, RF-inductive heating, and the like. In some systems, the substrate can be heated during deposition to alter the composition/stress of the deposited material.

In an embodiment, the process may include a low-pressure chemical vapor deposition step (LPCVD), which may be performed in a reactor at temperatures up to about 900° C. and beyond. The deposited film is a product of a chemical reaction between the source gases supplied to the reactor.

In an embodiment, the process may include an oxidation step, wherein the substrate is placed in a high temperature furnace in which oxygen or water vapor is introduced. At elevated temperature the oxygen will diffuse into the substrate at high rate causing at least a partial oxidation of the material. It is possible to speed up the process further by operating at elevated furnace pressures.

In an embodiment, the process may include a plasma enhanced chemical vapor deposition step (PECVD), which may be performed in a reactor at temperatures up to about 700° C. and beyond. The deposited film is a product of a chemical reaction between the source gases supplied to the reactor. A plasma is generated in the reactor to increase the energy available for the chemical reaction at a given temperature.

In an embodiment, the process may include spin casting, wherein a substrate is held by vacuum on a chuck. The material to be deposited is dissolved in a solvent. The solution is applied to the substrate, which is then rotated at high speed. The rotation spreads the solution evenly over the surface and also causes some of the solvent to evaporate leaving a thin film of material on the substrate. The substrate is usually baked immediately after spin casting to remove the remaining solvent in the film.

In an embodiment, the process may include a sputtering step, wherein the substrate is placed in a vacuum chamber with a target of the material to be deposited. A plasma is generated in a passive source gas (i.e. Argon) in the chamber, and the ion bombardment is directed towards the target, causing material to be sputtered off the target and condense on the chamber walls and the substrate. A strong magnetic field (magnetron) can be used to concentrate the plasma near the target to increase the deposition rate.

In an embodiment, multiple extremely thin (1 to 100 or so atomic layers) conformal coatings may be applied onto a collection of the raw carbon nanotubes. The tube lengths may vary from sub-microns to centimeters. The conformal coatings may comprise a variety of select metals and/or insulators including the glasses disclosed above, with aluminum, titanium, silicon, and/or related materials including $SiO_2$ glass, $TiO_2$ glass, $SiO_2$—$TiO_2$ glass, combinations thereof, and the like being more preferred.

The coating comprising the carbon nanotube composite may be applied to ultimately produce a high strength (metal-to-metal type) bond between one carbon nanotube and another carbon nanotubes and/or an interstitial material. The coatings may be applied as one or several layers, preferably wherein at least one layer provides the appropriate chemistry to sparsely bond (under the anodic bonding conditions, or the like) to the carbon nanotubes. Other additional layers would preferably provide the interstitial material between the carbon nanotube matrix.

In an alternative method of producing the desired layer, the carbon nanotubes may be exposed to a reactive gas at elevated temperatures, e.g., using a procedure consistent with Wong et al. Growth of Metal Carbide Nanotubes and Nanorods, Chem. Mater. 1996, 8, 2041-2046, the contents of which are fully incorporated herein by reference. However, in the practice of the instant disclosure, it is to be understood that one does not want to convert all of the tube to another substance, but merely process and/or read the tubes so that only sparse bonds of functional groups occur on the surface of a plurality of carbon nanotubes. After the chemical modification of the surface, the nanotubes may then be contacted with bridging moiety precursors and/or coated with additional materials to supply the interstitial material of the final composite.

The coated and/or reaction modified nanotubes may then be aligned as desired, and/or compressed and placed under anodic bonding conditions to produce the composite of the instant disclosure.

In an embodiment, carbon nanotubes having only sparse bonds of bridging moieties and/or functional groups comprise, in the final composite, a wt/wt ratio of mass of bridging moiety and/or functional group to mass of carbon nanotubes of about $1*10^{-9}:1$ bridging moieties and/or functional groups:carbon nanotube to about $1*10^{-2}:1$ bridging moiety and/or functional group:carbon nanotube. Within this range, the wt/wt ratio of mass of bridging moieties and/or functional groups to mass of carbon nanotubes is preferably less than or equal to about $1*10^{-3}:1$ with less than or equal to about $1*10^{-4}:1$ being still more preferred. Further, within this range, the wt/wt ratio of mass of bridging moieties and/or functional groups to mass of carbon nanotubes is preferably greater than or equal to about $1*10^{-8}:1$ with greater than or equal to about $1*10^{-6}:1$ being still more preferred.

The mirror supports and/or blanks which may become suitable for use as a mirror support of the instant disclosure may have physical and electrical properties which approach those of individual carbon nanotubes. Such properties may be anisotropic, consistent with single carbon nanotubes. In an embodiment, a layering process may be utilized to take advantage of the anisotropic material properties of the nanotube composites under consideration to produce a composite having isotropic properties. For example, the Coefficient of thermal-expansion of a composite may be different along the major axis of the aligned tubes versus perpendicular to the major axis of the aligned tubes. Layers of aligned carbon nanotube composites of the instant disclosure oriented essentially orthogonal to one another may result in a composite having isotropic coefficient of thermal expansion.

The instant process may further conclude an alignment step, wherein the carbon nanotubes are aligned as discussed herein. This step may come before and/or after the carbon nanotubes are coated, reacted, or the like, depending on the parameters of the process.

Accordingly, an embodiment of the composite of the instant disclosure may comprise a laminate, the laminate comprising a plurality of layers each in physical contact with at least one other layer, wherein at least one of the plurality of layers comprises a plurality of carbon nanotubes, wherein at least two of the plurality of carbon nanotubes are bonded to each other through a bridging moiety bound to each of the two carbon nanotubes. In an embodiment, at least two of the layers may be aligned one with the other such that non-isotropic (anisotropic) material properties of the individual layers are increased. In an embodiment, at least two of the layers may be aligned one with the other such that anisotropic material properties of the individual layers are reduced. The layers of the laminate may also be bonded one to the other through one or more bridging moieties bound to at least two carbon nanotubes.

In an embodiment, the composition of the various layers may also be manipulated to either increase or decrease anisotropic properties of the various individual layers of the laminate.

The anodic bonding step is preferably conducted under mechanical pressure, heat and an electric field appropriate to each specific anodic bond set of conditions, which are dependent on the materials under bond. These conditions will generally be adjusted for a specific application. Also, the bonding process may be advantageously modified by the addition of mechanical and/or sonic and/or electromagnetic energy (including thermal) to complete/complement the bonding process.

In an embodiment, an anodic bonding step of the instant disclosure may include the material being mechanically compressed, and energetically excited. The energetic excitation may be by conventional means using an appropriate electric field to expedite migration of ions and bonding in the material and across material interfaces to produce a rigid final product, or the like.

In an embodiment, the mirror support may be produced by first producing a laminate comprising a plurality of aligned carbon nanotubes either interconnected, intraconnected, or both, followed by machining, polishing, and/or otherwise shaping of the laminate to produce the instant mirror support. In another embodiment, the steps of producing a mirror support may include forming a laminate over and/or onto an optically smooth mould such that the laminate takes on the optical surface of the mould to produce the mirror support, wherein the laminate comprises a plurality of carbon nanotubes, wherein at least two of the plurality of carbon nanotubes are bonded to each other through a bridging moiety bound to each of the two carbon nanotubes, and/or a plurality of carbon nanotubes interconnected to at least one additional carbon nanotube through a bridging moiety, and/or, interconnected carbon nanotubes connected through a bridging moiety which form a web of interconnected carbon nanotubes, which may be arranged in layers or webs, and/or layers of webs of interconnected carbon nanotubes interconnected between the layers through bridging moieties.

The mirror support so-formed may then be further processed and/or manipulated to produce the final mirror support, consistent with the intended end use thereof.

Mirror supports of the instant disclosure comprising the composites of the instant disclosure would comprise physical, chemical, electrical, and/or other properties which approach those of individual carbon nanotubes. The mirror support according to the instant disclosure would preferably include a low areal density, a high thermal conductivity, a low coefficient of thermal expansion, high stiffness, a high strength to weight ratio, high reflectivity throughout much of the UV, IR and radio spectrum, and would be superconductive when cooled below 100° K.

In an embodiment, the mirror supports of the instant disclosure preferably include a low areal density, preferably less than or equal to about 10 kg/m² (kg per square meter), with less than or equal to about 5 kg/m² being preferred, with less than or equal to about 4 kg/m² being more preferred, with less than or equal to about 3 kg/m² being more preferred, with less than or equal to about 2 kg/m² being more preferred, with less than or equal to about 1 kg/m² being more preferred, with less than or equal to about 0.5 kg/m² being yet still more preferred.

In an embodiment, the mirror supports of the instant disclosure preferably possess unique longitudinal (along the nanotube's major axis) thermal conductivity including expected superconductivity at low absolute temperatures of less than or equal to about 100° K, and other properties of individual carbon nanotubes, which would far surpass current material technologies (substrates) capabilities including (ULE) Ultra Low Expansion ceramic, Zerodur, Silicon Carbide, Berylium, and the like. The thermal conductivity of the instant mirror supports would preferably be greater than or equal to about 1 W/(m° K), preferably greater than or equal to the thermal conductivity of steel (e.g., greater than or equal to about 12.11 W/(m° K), preferably greater than or equal to about 45.0 W/(m° K)), preferably greater than or equal to the thermal conductivity of lead (e.g., greater than or equal to about 35.3 W/(m° K)) preferably greater than or equal to the thermal conductivity of aluminum (e.g., greater than or equal to about 237 W/(m° K)), preferably greater than or equal to the thermal conductivity of gold (e.g., greater than or equal to about 318 W/(m° K)), preferably greater than or equal to the thermal conductivity of copper (e.g., greater than or equal to about 401 W/(m° K)), preferably greater than or equal to the thermal conductivity of silver (e.g., greater than or equal to about 429 W/(m° K)), preferably greater than or equal to the thermal conductivity of diamond (e.g., greater than or equal to about 900 W/(m° K), preferably greater than or equal to about 2320 W/(m° K).)

Mirror supports of the instant disclosure would preferably have a relatively low lineal coefficient of thermal expansion. Mirror supports of the instant disclosure would also preferably have a relatively low coefficient of volumetric thermal expansion β, which is equal to 3 times the lineal coefficient of thermal expansion a for the isotropic case. In an embodiment, the lineal coefficient of thermal expansion of the mirror support a (in $10^{-6}$/K at 20° C.) would be less than or equal to about 50, preferably less than or equal to about 40, preferably less than or equal to about 30, preferably less than or equal to about 20, preferably less than or equal to about 10, preferably less than or equal to about 9, preferably less than or equal to about 8, preferably less than or equal to about 7, preferably less than or equal to about 6, preferably less than or equal to about 5, preferably less than or equal to about 4, preferably less than or equal to about 3, preferably less than or equal to about 2, preferably less than or equal to about 1, preferably less than or equal to about 0.5 microinches per ° K at 20° C. In an embodiment, the lineal coefficient of thermal expansion of the mirror support a (in $10^{-6}$/K at 20° C.) would be less than or equal to the coefficient of thermal expansion of lead, i.e., less than or equal to 29;
aluminum, i.e., less than or equal to 23;
brass, i.e., less than or equal to 19;
silver, i.e., less than or equal to 18;
copper, i.e., less than or equal to 17;
stainless steel, i.e., less than or equal to 17;
gold, i.e., less than or equal to 14;
nickel, i.e., less than or equal to 13;
concrete, i.e., less than or equal to 12;
iron, i.e., less than or equal to 11;
carbon steel, i.e., less than or equal to 10.8;
platinum, i.e., less than or equal to 9;
glass, i.e., less than or equal to 8.5;
gallium(III)arsenide, i.e., less than or equal to 5.8;
indium phosphide, i.e., less than or equal to 4.6;
tungsten, i.e., less than or equal to 4.5;
pyrex glass, i.e., less than or equal to 3.3;
silicon, i.e., less than or equal to 3;
invar, i.e., less than or equal to 1.2;
diamond, i.e., less than or equal to 1; and/or
quartz, i.e., less than or equal to 0.59.

Mirror supports of the instant disclosure would preferably have a tensile strength of greater than or equal to about 10 Gpa, preferably greater than or equal to about 20 Gpa, with greater than or equal to about 50 Gpa being more preferred.

Mirror supports of the instant disclosure may have a density of about 1.3-1.4 g/cm³ or less and a specific strength of greater than or equal to about 100 kN·m/kg, preferably greater than or equal to about 1,000 kN·m/kg, with greater than or equal to about 10,000 kN·m/kg being more preferred.

Mirror supports of the instant disclosure may have a Young's Modulus (TPa) from about 1 to about 5, a tensile strength (GPa) from about 10 to about 50, and an elongation at break (%) of greater than or equal to about 5%, preferably about 5 to about 20%.

Mirror supports of the instant disclosure may have either metallic and/or semi-conductor properties, which may include having an electrical current density more than 1,000 times greater than silver or copper. Mirror supports of the instant disclosure may further exhibit superconductive properties at relatively low temperatures at less than or equal to about 100° K, preferably less than or equal to about 50° K.

Mirror supports of the instant disclosure may have a current transmission rate of greater than about 1,000 watts per meter per ° K at 20° C., such that the instant mirror support may be able to transmit greater than or equal to about 1,000 watts per meter per ° K at 20° C., preferably greater than or equal to about 2,000, preferably greater than or equal to about 3,000, preferably greater than or equal to about 4,000, preferably greater than or equal to about 5,000, preferably greater than or equal to about 6,000 watts per meter per ° K at 20° C. The instant mirror support may further comprise a temperature stability up to about 2800° C. in a vacuum, and up to about 750° C. in air.

It should be understood, of course, that the foregoing relates to preferred embodiments of the invention and that modifications may be made without departing from the spirit and scope of the invention as set forth in the following claims.

I claim:

1. A method to produce a mirror support comprising:
   forming a plurality of carbon nanotubes;
   providing a bottom substrate having ions capable of migration upon application of an energy source;
   arranging the plurality of carbon nanotubes on the bottom substrate after the carbon nanotubes are formed;
   applying a layer of an interstitial matrix material on the carbon nanotubes;
   compressing the carbon nanotubes and interstitial matrix layer with a top substrate;
   applying electric potential to the substrates, carbon nanotubes, and interstitial layer to form the mirror support, wherein the carbon nanotubes are bonded to each other through a bridging moiety bound to each of the carbon nanotubes; and,
   attaching the mirror support to a mirror.

2. The method of claim 1, further comprising an alignment step, wherein prior to the applying a layer of interstitial matrix material, a plurality of the carbon nanotubes are aligned such that a portion of the carbon nanotubes has a major axis essentially parallel to that of another in an amount greater than would be present in a random collection of carbon nanotubes.

3. The method of claim 1, further comprising increasing the temperature to the substrates, carbon nanotubes, and interstitial matrix layer concurrent with applying electric potential.

4. The method of claim of claim 3, further comprising the steps of repeating the depositing a layer of carbon nanotubes and applying a layer of an interstitial matrix layer steps.

5. The method of claim 3, wherein increasing the temperature comprises a range of from about 100 degrees celsius to about 800 degrees celsius.

6. The method of claim 1, wherein the bottom substrate comprises a glass material.

7. The method of claim 1, wherein the ions are selected from the group of metal ions, sodium ions, doping compound ions, or a combination thereof.

8. The method of claim 1, further comprising the step of applying a second layer of carbon nanotubes between the interstitial matrix layer and the top substrate.

9. The method of claim 8, further comprising the step of applying a second interstitial matrix layer between the second layer of carbon nanotubes and the top substrate.

10. The method of claim 1, further comprising the step of preparing the bottom substrate before depositing the carbon nanotubes by a process selected from the group of patterning, etching, oxidation, or a combination thereof.

* * * * *